(12) United States Patent
Skordas

(10) Patent No.: US 7,909,208 B2
(45) Date of Patent: Mar. 22, 2011

(54) PROCESS OF MONITORING DISPENSING OF PROCESS FLUIDS IN PRECISION PROCESSING OPERATIONS

(75) Inventor: Spyridon Skordas, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 11/947,856

(22) Filed: Nov. 30, 2007

(65) Prior Publication Data

US 2009/0139451 A1 Jun. 4, 2009

(51) Int. Cl.
*G01F 11/00* (2006.01)

(52) U.S. Cl. .................................. 222/1; 222/58; 73/296

(58) Field of Classification Search ............... 222/1, 23, 222/39, 50, 52, 58, 14, 129, 135–136; 700/231, 700/240, 121; 702/100–101, 105; 118/715; 141/83; 73/296; 177/59
See application file for complete search history.

(56) References Cited

U.S. PATENT DOCUMENTS

| 4,844,297 A | 7/1989 | Smith |
| 7,770,448 B2 * | 8/2010 | Misra et al. ............... 73/296 |

* cited by examiner

*Primary Examiner* — Frederick C. Nicolas
(74) *Attorney, Agent, or Firm* — Scully, Scott, Murphy & Presser, P.C.; Wenjie Li, Esq.

(57) ABSTRACT

A process of monitoring the dispensing of process fluids in precision processing operations. A precision measuring instrument measures a cumulative amount of a process fluid dispensed to at least one dispensing station and compares that amount with a predetermined amount. An alarm is provided to an operator when the cumulative actual required amount of process fluid dispensed after a preset number of dispensations differs from the cumulative predetermined dispensed amount of that fluid by more than a preset percentage.

12 Claims, 1 Drawing Sheet

PROCESS OF MONITORING DISPENSING OF PROCESS FLUIDS IN PRECISION PROCESSING OPERATIONS

BACKGROUND OF THE INVENTION

1. Field of the Invention

The present invention is directed to a process of measuring processing fluids dispensed in precision processing operations. More particularly, the present invention is drawn to a process of measuring processing fluids dispensed during in semiconductor processing.

2. Discussion of the Prior Art

In many processing operations sequential dispensing of process fluids occur. In most such cases the amount of fluid dispensed is critical to proper processing of the desired product. Moreover, continuous operation is also dependent upon precision dispensing of the process fluid. Of course, process fluid costs further emphasizes the criticality of precision dispensing of the fluid.

Semiconductor processing, wherein semiconductors are prepared, exemplifies such processing operations. In the manufacture of semiconductors sequential dispensing of fluids in continuous, automated processing occurs. It is to processes of this type that the present invention is addressed.

In semiconductor processing, lithography tools are essential for spin coating and developer applications. Amongst the process fluids dispensed in lithography tools are photoresist materials, antireflective coating materials, via fill/planarization materials, passivity materials, rinse solvents, developer solvents, adhesion promoters and the like. All of these materials are costly and their spillage represent an environmental hazard.

In addition to these requirements, it is essential for proper processing of a semiconductor wafer that the exact desired amount of the fluid compounds be dispensed in each step. The dispensing of these process fluids in excess of what is required for proper processing can result in costly over-utilization of the dispensed compound as well as increasing the chance of releasing hazardous waste into the environment. The dispensing of inadequate volumes of requisite process fluids, on the other hand, can result in product degradation and semiconductor failure.

At present, monitoring of process fluids for detection of improper fluids usage in precision processing operations is addressed by either direct measurement or by inference. In direct measurement, the precision processing operation is halted to permit such measurement. The processing equipment is inspected at the cost of extensive downtime and time consuming restart up operations.

If the second prior art detection method is elected, e.g. inference, structural defect data obtained using PLY (process limited yield) methods or electrical defect characterization data obtained using electrical testing is analyzed. This method is similarly faulty because inference methods rely on measurement, data collection, and data analysis at various stages between processing steps. This means that incorrect dispensing of process fluids will be detected much later after the fact. The mean-time-to-detect (MTTD) depends on what stages of the manufacturing flow these measurements are scheduled to take place. Furthermore, detection assumes the existence of sufficient control schemes and in many cases demands the appropriate reaction from human operators and engineers. By the time the problem is identified and corrective action is taken, several hundreds of product units may be already irreversibly damaged, resulting into yield degrades or scrapping of the defective product units. At best, the faulty products must be reworked at significant reprocessing costs.

These methods are well exemplified by semiconductor wafer manufacturing operations. Presently, chemical usage in such operations, when measured by direct volumetric measurement, requires labor intensive semiconductor tool downtime to permit that measurement. The tools are opened and exposed during the measurement. It furthermore requires FM (foreign material) monitors to run before they can be reused in production. Obviously, the semiconductor tools are unavailable for productive use during this period.

The second prior art method of detecting incorrect process fluid usage in semiconductor production processing, involves data analysis of problematic product using PLY and electrical characterization methods. This solution involves problem detection after semiconductor wafer production has been completed. Thus, if an error is found, the best outcome that can be accomplished is a rework of the semiconductor wafers produced therebefore, which significantly increases cost and reduces productivity.

In the worst case scenario, semiconductor wafer product lots have to be scrapped because the defects are catastrophic and cannot be reworked. This is so insofar as it can oftentimes be two or three days before semiconductor wafer defects are detected. Thus, semiconductor wafer loses can be very extensive. In this regard, it should be appreciated that detection depends on human response to PLY signals. Therefore, faulty human response can lead to further delays in detection and corrective actions. As a corollary, special training of personnel may be required.

The above remarks make it apparent that a processing scheme that automatically responds to too high or too low dispensed amounts of semiconducting processing chemicals, especially a processing scheme which would include appropriate warning signals, at the time and at the place where the chemicals are dispensed, would represent a significant processing advance. Such a system would eliminate production disruptions resulting from direct volumetric measurements or, alternatively, eliminate the possibility of large write-offs of inappropriately produced semiconductor product.

Attempts to monitor dispensed liquid in chemical processing operations have been attempted in the past. U.S. Pat. No. 4,844,297 describes a process and apparatus for dispensing a desired quantity by weight of a fluid material. In that disclosure, a dispensing system is employed wherein the weight of dispensed compounds through each dispensation line is weighed. In this system, fluid in each dispensing line is weighed to control or check the weight of chemical fluid dispensed and compared to the desired dispensing weight.

In processing operations requiring continuous sequential dispensing of process fluids, however, there are typically numerous dispensing lines making individual monitoring of each dispensing line highly complex, expensive and, oftentimes, even disruptive of satisfactory operation of the monitored process.

This analysis emphasizes the need in the art for a new, more improved process of monitoring dispensing of process fluids in precision processing operations.

BRIEF SUMMARY OF THE INVENTION

A new process has now been developed for monitoring the dispensing of process fluids in precision processing operations which makes it possible to overcome the problems associated with the prior art methods of direct volumetric measurement and inference.

In accordance with the present invention, a program storage device readable by a machine tangibly embodying a program of instructions executable by a machine to perform process steps for monitoring dispensing of process fluids in a precision processing operation is provided. In this process a container filled with a process fluid is initially disposed in measuring communication with a precision measuring instrument. The container is in communication with a manifold in communication with at least one dispensing line. A predetermined required amount of processing fluid, required for each sequential dispensation from the container required to supply all lines in communication with the manifold, is preset. A predetermined cumulative number of dispensing steps of the process fluid from the container is preset. A cumulative number of dispensing steps, a cumulative amount of process fluid actually dispensed and a cumulative predetermined required amount of process fluid are all set at zero. The predetermined required amount of process fluid in each dispensing operation is dispensed from the container to the manifold. One is added to the cumulative number of dispensing operations and the predetermined required amount of process fluid dispensed is added to the cumulative predetermined process fluid amount dispensed. At the same time, the container holding the process fluid is measured. The actual amount of process fluid dispensed is determined. That amount is added to the cumulative amount of process fluid actually dispensed. The dispensing operation is repeated until the predetermined number of dispensing operations is reached. The cumulative predetermined measured amount of process fluid dispensed is thereupon compared to the cumulative actual amount of process fluid dispensed. If the cumulative amounts are the same or within a predetermined percentage of each other, the entire procedure is repeated without interruption in the processing operation. If the cumulative totals differ from each other by more than the predetermined percentage, an error signal is communicated so that corrective action can be taken.

BRIEF DESCRIPTION OF THE DRAWINGS

The present invention may be better understood by reference to the accompanying drawings of which.

DETAILED DESCRIPTION OF THE INVENTION

Figure 1:
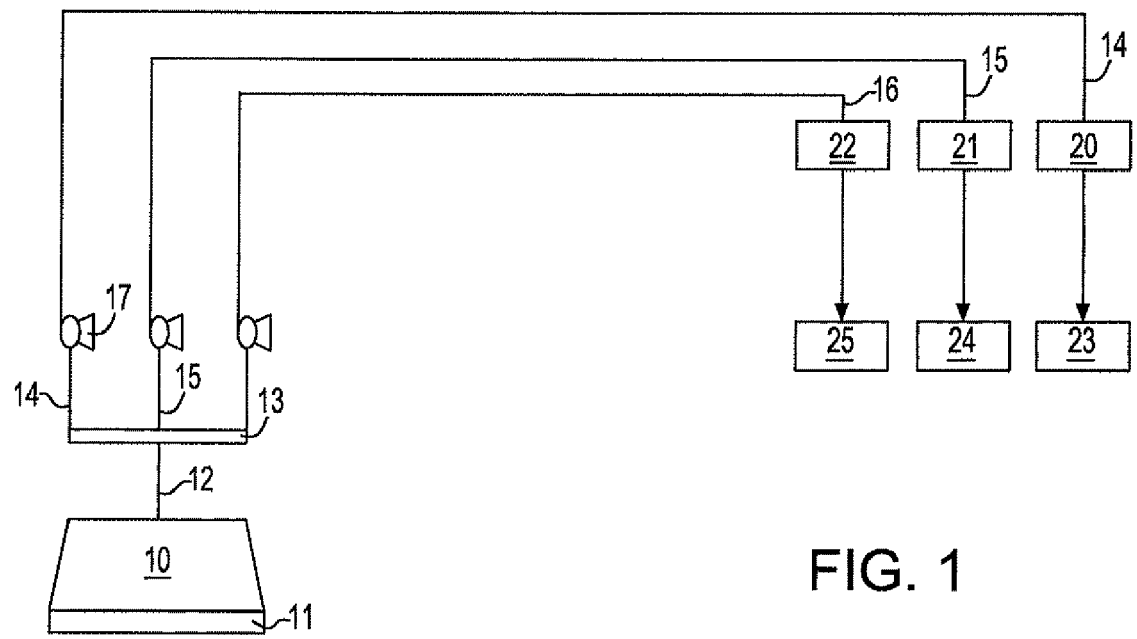
FIG. 1 is a schematic diagram of a dispensing system in accordance with the present invention.
Figure 2:
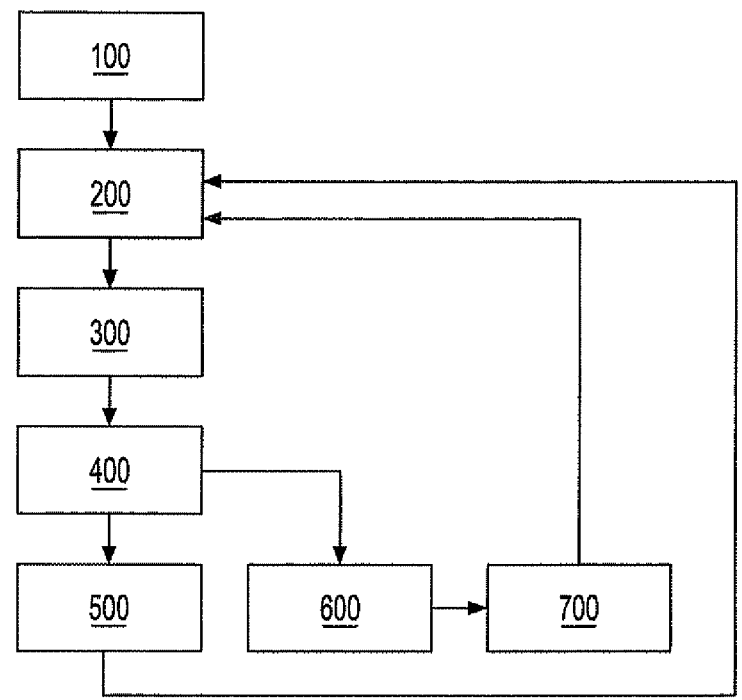
FIG. 2 is a process flow diagram of the present invention.

The process of the present invention provides a method for assuring correct dispensation of process fluids utilized in sequential precision processing operations. Among the processes that may benefit from the practice of the present invention is the manufacture of semiconductors wherein continuous sequential operations occur. The term "semiconductor" is used generically to encompass not only wafers but the production of other precision surfaces as well known to those skilled in the electronic arts. These operations require precision dispensation of various process fluids which form microscopic-sized film layers on the surface of the precision material, such as a semiconductor wafer. In processing of precision materials, including semiconductor wafers, fluids which form photoresist films, antireflective coating films, opening fillers, such as vias, materials which planarize, passify and the like, rinse solvents, developments solvents, adhesion promoters and the like are sequentially disposed on a precision surface in accordance with the desired characteristics of the resultant semiconductor or other precision product.

A process in accordance with the present invention is illustrated in the drawings. A container 10, which may be a chemical bottle, a pressure vessel, a bulk feeding tank or the like, is filled with a process fluid. In many cases, the process fluid is a liquid compound. In those cases, the precision measuring instrument is a precision scale. Thus, container 10 is disposed on a precision scale 11. If the fluid is a gas, the precision instrument measuring dispensing of the gas from the container is a pressure sensor. The container holding the gas is a pressure vessel, such a pressurized bottle.

This process step is illustrated in the flow diagram by step 100. In step 100 container 10 is placed on a precision scale or is in communication with a precision pressure indicator. Both the precision scale and the pressure indicator are represented by reference number 11. The weight or pressure indicated is transmitted to a program storage device readable by a machine tangibly embodying a program of instructions executable by the machine to perform process steps.

The predetermined amount of process fluid, to be dispensed from container 10, based on process requirements, is preset. That amount, denoted by the symbol $V[PR(n,i)]$, represents the amount of fluid to be dispensed from the container 10 into at least one dispensing line. The symbol PR identifies the fluid. The symbol n identifies the conduit in communication with the container 10 through which fluid is dispensed and i represents the quantity of fluid to be dispensed through line n.

Each container 10 is in communication with at least one dispensing line. This is illustrated in the drawings by lines 1, 2 and "n" where n is highest number of the lines in fluid communication with container 10. The predetermined total required amount of fluid necessary to be dispensed through conduits 1, 2, . . . n is dispensed through conduit 12 to manifold 13. Thereupon it is distributed, by methods known in the art, to conduits 14, 15 and 16 feeding lines 1, 2, and n, respectively. Each of these lines are provided with pumping means 17, 18 and 19, respectively. Reservoirs for lines 1, 2, . . . and n may be provided as illustrated at 20, 21 and 22, respectively. The fluid is dispensed from lines 1, 2, and n, as illustrated by arrows 23, 24 and 25, respectively.

The amount dispensed from each line may be measured by weight or volume in the case where the fluid is a liquid. The actual amount of liquid dispensed is the weight difference as measured by the precision scale 11, before and after each dispensation into conduit 12. This weight may be used as the cumulative amount actual dispensed. Alternatively, this amount may be measured in volume units, with a knowledge of the density of the liquid in container 10.

Alternatively, when the fluid is a gas, the amount of gas dispensed is measured by the pressure before and after dispensing of the gas in a dispensing step into lines 1, 2, . . . and n. As in the case of liquid dispensation, the gas is dispensed into conduit 12, into manifold 13 into conduits 14, 15 and 16 and its final dispensation is illustrated by arrows 23, 24 and 25 respectively. This measurement in pressure units may be converted to volume or weight units by suitable knowledge of the physical properties of the gas.

Before the first dispensing of the process fluid, a predetermined number of dispensing steps of the process fluid is preset in the program storage device. In addition, a cumulative number of dispensing steps, a cumulative predetermined required amount of process fluid and a cumulative actual amount of process fluid dispensed are all set at zero.

Step 200 emblemizes the predetermined required amount of process fluid provided to manifold 13, through conduit 12, in a dispensing step, wherein fluid exits as arrows 23, 24 and 25. Upon completion of the dispensing of process fluid in step 200, calculation step 300 occurs wherein the cumulative number of dispensations of process fluid into conduit 12 is increased by one, the cumulative predetermined required amount of process fluid is increased by the amount of process fluid predetermined to be dispensed in each dispensation, and the cumulative amount of process fluid dispensed in the aforementioned dispensation is added to that total.

Steps 200 and 300 are repeated until the number of predetermined dispensations N(n,i) is reached. At that point, step 400 occurs. In step 400 the cumulative predetermined required volume of process fluid is compared to the cumulative amount of process fluid actually dispersed. If the two amounts are the same or within a predetermined percentage difference, the process goes to step 500 wherein the actual number of dispensings of process fluid, the cumulative predetermined required volume and the cumulative amount of process fluid actually dispensed are reset at zero and the process restarted at step 200.

In the event that the comparison result of step 400 is a difference in excess of the predetermined permitted percentage, the process goes to step 600 where an alarm is conveyed to the process operator indicating that either not enough process fluid is being dispensed in each dispensation of process fluid or that too much process fluid is dispensed in each dispensation step.

In either case, the dispensing of process fluid is adjusted in step 700 to either increase or decrease the actual amount of process fluid dispensed. This is followed by an identical resetting of cumulative totals to 0, as occurs in step 500, and a return to step 200.

The above descriptions and embodiments are given to illustrate the scope and spirit of the present invention. These embodiments will make apparent, to those skilled in the art, other embodiments and examples. These other embodiments and examples are within the contemplation of the present invention. Therefore, the present invention should be limited only by the appended claims.

Having thus described our invention, what we claim as new and desire to secure by Letters Patent is:

1. A program storage device readable by a machine tangibly embodying a program of instructions executable by the machine to perform process steps for controlling dispensing of process fluids comprising the steps of:
  (a) disposing a container filled with a process fluid in measuring communication with a precision measuring instrument, said container in communication with a manifold feeding at least one dispensing station;
  (b) presetting a predetermined cumulative number of dispensing operations of said process fluid from said container;
  (c) presetting a predetermined required amount of said process fluid to be dispensed from said container in each dispensing step;
  (d) setting a cumulative number of actual dispensing steps, a cumulative amount of process fluid actually dispensed and a cumulative predetermined required amount of process fluid at zero;
  (e) dispensing said predetermined required amount of said process fluid;
  (f) adding said amount measured in step (e) to said cumulative predetermined required amount of process fluid and one to said cumulative number of actual dispensing operations;
  (g) measuring said actual amount of process fluid dispensed in step (e);
  (h) adding said amount measured in step (g) to said cumulative amount of process fluid actually dispensed;
  (i) repeating steps (e) to (h) until said predetermined number of dispensing operations, preset in step (b), is reached;
  (j) comparing said cumulative amount of process fluid actually dispensed to said predetermined cumulative required amount of process fluid dispensed;
  (k) repeating steps (d) to (j) if said cumulative amount of process fluid actually dispensed and said predetermined cumulative required amount of process fluid are the same or are within a predetermined percentage difference of each other;
  (l) signaling an error if said cumulative amount of process fluid actually dispensed and said predetermined cumulative required amount of process fluid are different by more than said predetermined difference of each other; and
  (m) taking corrective action to eliminate said difference measured in step (l) and repeating steps (d) to (j).

2. A device in accordance with claim 1 wherein said fluid is a liquid.

3. A device in accordance with claim 2 wherein said instrument used in said measuring step (g) is a precision scale upon which said container is disposed.

4. A device in accordance with claim 3 wherein said amount of process liquid is measured in mass units.

5. A device in accordance with claim 3 wherein said amount of process liquid is measured in volume units from a knowledge of the density of said process liquid.

6. A device in accordance with claim 1 wherein said fluid is a gas.

7. A device in accordance with claim 6 wherein said instrument used in step (g) is a precision pressure gauge.

8. A device in accordance with claim 7 wherein said amount of process gas is measured in pressure units.

9. A device in accordance with claim 1 wherein said manifold is in fluid communication without at least two dispensing stations.

10. A device in accordance with claim 1 wherein said process is continuous and sequential.

11. A device in accordance with claim 10 wherein said process is the manufacture of precision surfaces.

12. A device in accordance with claim 11 wherein said process is the manufacturer of semiconductor wafers.

* * * * *